SYNCHRONIZING SYSTEM FOR TELEVISION RECEIVERS

Filed Jan. 30, 1967 2 Sheets-Sheet 1

INVENTORS.
DENIS P. DORSEY &
ROSS W. BRUCE
BY Eugene M. Whitacre
Attorney

SYNCHRONIZING SYSTEM FOR TELEVISION RECEIVERS

Filed Jan. 30, 1967 2 Sheets-Sheet 2

INVENTORS:
DENIS P. DORSEY &
ROSS W. BRUCE
BY Eugene M. Whitacre
ATTORNEY

United States Patent Office 3,469,032
Patented Sept. 23, 1969

3,469,032
SYNCHRONIZING SYSTEM FOR TELEVISION RECEIVERS

Denis P. Dorsey and Ross W. Bruce, Levittown, Pa., assignors to Radio Corporation of America, a corporation of Delaware Filed Jan. 30, 1967, Ser. No. 612,465
Int. Cl. H04l 7/04
U.S. Cl. 178—69.5 7 Claims

ABSTRACT OF THE DISCLOSURE

Synchronizing control apparatus for an interlaced scanning system to effectively remove from the synchronizing information used to control horizontal scanning those equalizing pulses and vertical serrations which are out of phase with the horizontal synchronizing pulses, so as to eliminate the warping or tearing of the reproduced picture at the start of each field they might otherwise cause. A pair of transistors and time constant networks generate a train of pulses synchronized with the in-phase pulses and serrations and with the horizontal synchronizing pulses.

This invention relates to the transmission of special message information to the public using existing television facilities, without interfering with regular television program service.

A system which accomplishes such transmission is disclosed in pending application, Ser. No. 551,084 filed May 18, 1966, and entitled "Television Message System." One embodiment of the system therein described sequentially multiplexes message representative line scan video signals developed by an auxiliary pick-up camera with primary program video signals developed by a studio pick-up camera during predetermined portions of the vertical blanking interval thereof at a rate of one line scan signal per message per field of program information. More particularly, these video message signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signal. The separated message signals may be recorded using a thin window type cathode ray tube and an associated Electrofax printer, while the primary program signals are displayed on the kinescope of the home receiver in the conventional way. As is described in the Ser. No. 551,084 application, the thin window tube displays one horizontal line of message information, which is printed on the advancing paper of the Electrofax printer. Since the kinescope of the home receiver is cut off during the vertical blanking interval, the message information included therein is not displayed and thus does not interfere with the regular program picture as seen by the viewer.

It is an object of the present invention to provide improved horizontal synchronizing control apparatus for the thin window cathode ray tube of such a television message system and, more particularly, apparatus which is unaffected by the equalizing pulses and serrations of the vertical synchronizing pulses of the primary program synchronizing signal that are out-of-phase with the horizontal synchronizing pulses thereof. (It will be understood that in the context used herein, those equalizing pulses and vertical serrations which follow the horizontal synchronizing pulses by an integral multiple, including one, of the horizontal line interval will be referred to as being "in phase" with the horizontal synchronizing pulses; correspondingly, those which follow by an odd multiple, including one, of one-half the horizontal line interval will be referred to as being "out-of-phase" with the horizontal synchronizing pulses.)

It is another object of this invention to provide improved synchronizing control apparatus for the deflection circuits of a television receiver.

As will become clear hereinafter, one embodiment of such synchronizing control apparatus includes first and second transistors and first and second time constant networks operative to render the control apparatus responsive to the in phase equalizing pulses and vertical serrations of the synchronizing information of a television signal, and unresponsive to the out-of-phase equalizing pulses and vertical serrations thereof. The apparatus generates a train of pulses synchronized with the in phase pulses and serrations and with the horizontal synchronizing pulses, with the duration of each pulse of the train being substantially equal to that of a horizontal synchronizing pulse. The resulting pulse train used to control the horizontal scan rate for the electron beam of either the cathode ray tube of the television message system or of a television receiver.

The novel features which are considered to be characteristic of the present invention are set forth with particularity in the appended claims. The invention, itself, however, both as to its organization and method of operation, and as to the advantages thereof, will best be understood by reference to the accompanying drawings in which:

Figure 1:
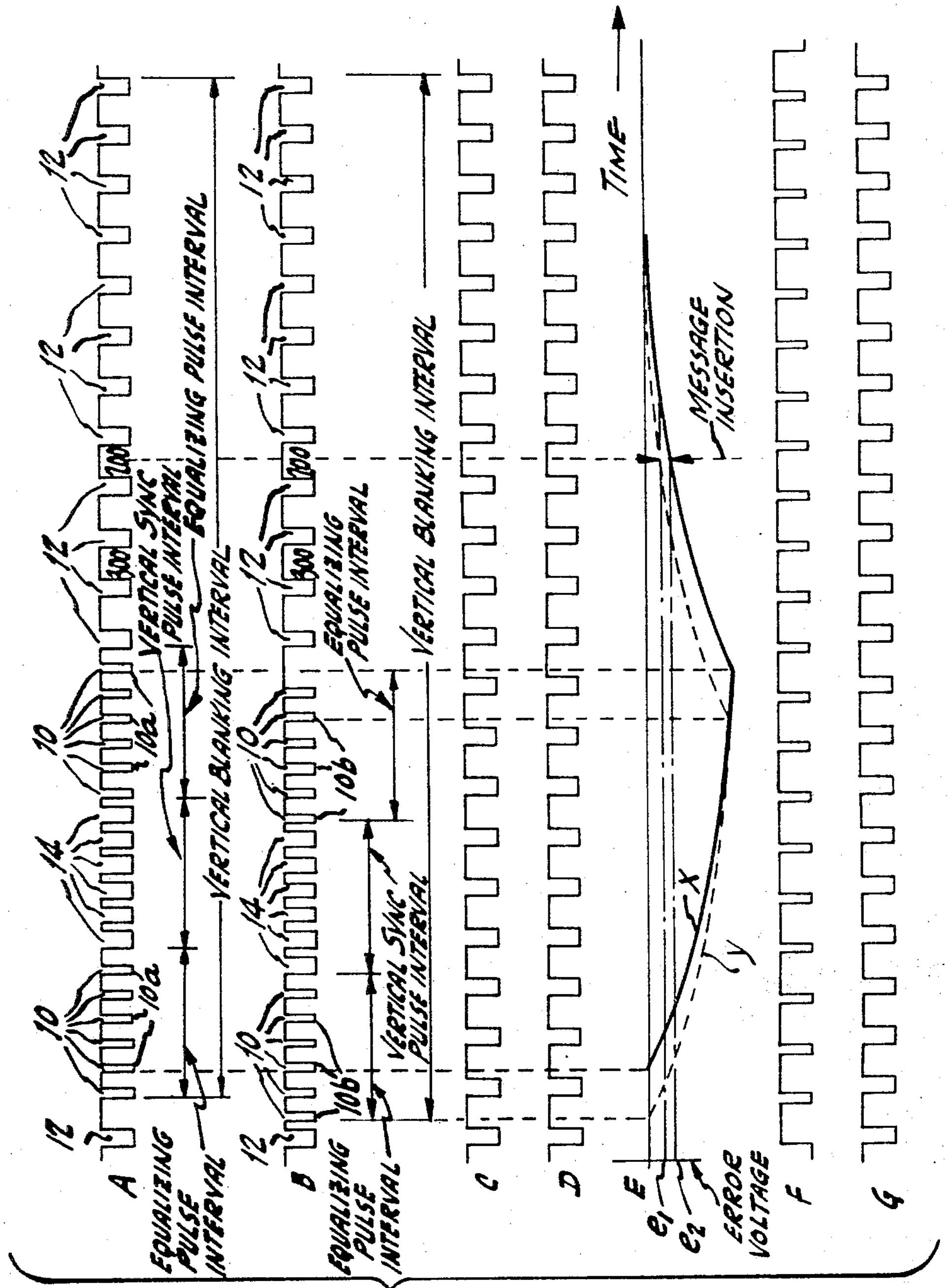
FIGURE 1 is a series of waveforms for alternate television scanning fields which are helpful in an understanding of the present invention.

Referring now to FIGURE 1, the waveforms A and B respectively illustrate (though not necessarily to scale) the vertical blanking interval for the even and odd fields of the interlaced television signal. As is well known, each of these intervals includes equalizing pulses 10, horizontal synchronizing pulses 12, and serrated vertical synchronizing pulses 14. The equalizing pulses 10 function to maintain vertical synchronization of a television receiver even though two interlaced scanning fields are utilized, while the horizontal synchronizing pulses 12 maintain horizontal synchronization of the receiver during the latter portion of each of the vertical blanking intervals. The serrated vertical synchronizing pulses 14 maintain horizontal synchronization of the receiver during vertical synchronizing pulses.

The composite synchronizing signal depicted in waveforms A and B is also used to synchronize the horizontal deflection in the thin window cathode ray tube of the above-described television message system receiver. When used in such a message system environment, the composite synchronizing signal additionally includes auxiliary video message signals located, for example, in that space in the vertical blanking interval indicated in waveforms A and B by the numeral "200." Message identifying category code signals might further be included, in the space denoted "300" for example, as described in that 551,084 application.

Figure 2:
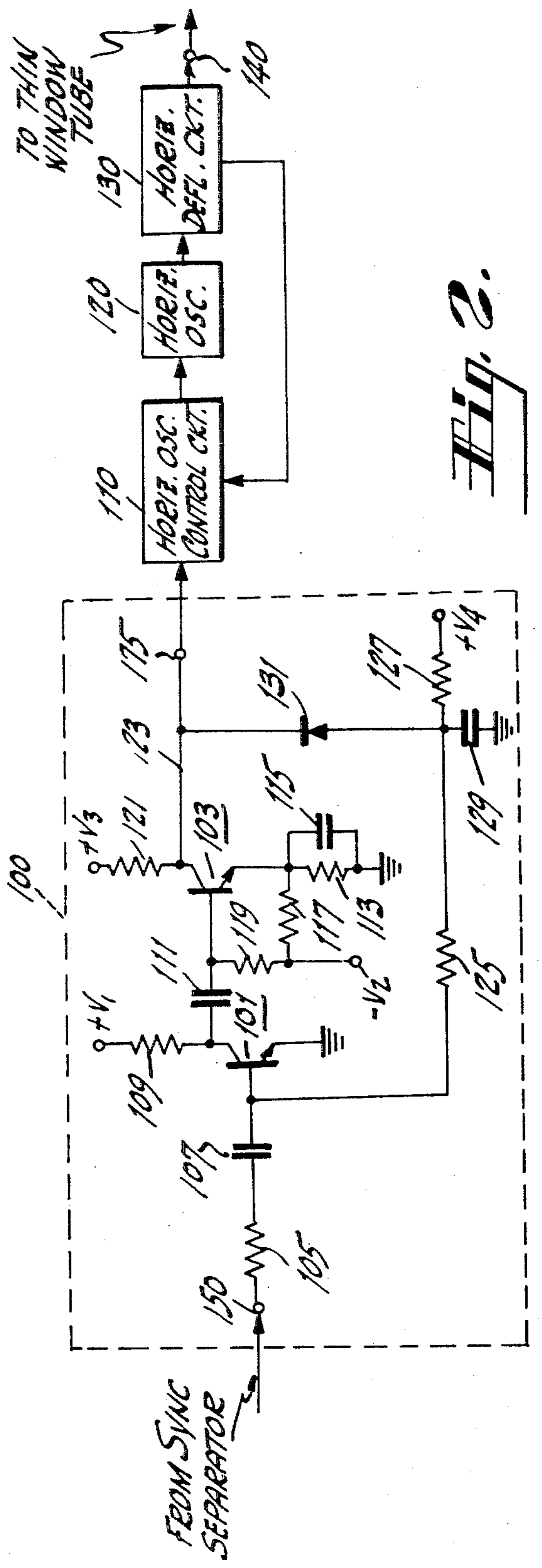
FIGURE 2 is a schematic circuit diagram, partly in block form, of a horizontal deflection system including synchronizing control apparatus embodying the invention.

Referring now to FIGURE 2, there is shown a schematic circuit diagram, partly in block form, of a horizontal deflection system including synchronizing control apparatus 100 embodying the present invention. Composite synchronizing signals of the form illustrated by waveforms A and B in FIGURE 1 are coupled from the synchronizing signal separator of the television message system to an input terminal 150 of the apparatus 100. As will subsequently become clear, apparatus 100 operates in response to the composite synchronizing signal to develop a train of pulses, the leading edges of which are in synchronism with the leading edges of those equalizing pulses and vertical serrations of the composite signal which are in phase with the horizontal synchronizing pulses thereof. Apparatus 100 also develops a train of pulses having leading edges which are synchronous with those of the horizontal synchronizing pulses. The resultant pulses are comparable in duration to that of the horizontal synchronizing pulses, and the trains at the horizontal synchronizing repetition rate for successive fields are illustrated respectively in waveforms C and D of FIGURE 1. It will be observed that the waveforms C and D are identical even though the applied waveforms A and B are not. It will also be observed that where there appears in waveforms A and B and equalizing pulse or vertical serration which is out-of-phase with the horizontal synchronizing pulses, no such out-of-phase pulse appears in waveforms C and D.

The pulses developed by apparatus 100 are applied via an output terminal 175 to a horizontal oscillator synchronizing control circuit 110, including an automatic frequency control phase detector, to maintain a horizontal oscillator 120 in synchronism with the received horizontal synchronizing pulses.

The horizontal oscillator 120, responsive to this frequency control, drives a horizontal deflection circuit 130 to produce horizontal deflection signals for the thin window tube of the television message system receiver at a terminal 140. Part of the deflection signal developed by circuit 130 is fed back to the oscillator control circuit 110 in the conventional manner.

In the interlaced scanning arrangement employed in the message system environment, the equalizing pulses and the serrations of the vertical synchronizing pulses occur at twice the horizontal synchronizing frequency, i.e. 31,500 c.p.s. as against 15,750 c.p.s. Of these equalizing pulses and vertical serrations, those which occur at input terminal 150 in phase with the horizontal synchronizing pulses serve to continue horizontal synchronization of the electron beam deflection in the thin window cathode ray tube. By virtue of the present invention, those pulses and serrations which occur at terminal 150 out-of-phase with the horizontal synchronizing pulses have no effect on the electron beam deflection since they are not present in the synchronizing information applied to the horizontal deflection circuit 130 (waveforms C and D of FIGURE 1). This is to be contrasted with the horizontal synchronizing control apparatus arrangement usually found in television receiver circuits, where the composite synchronizing signal is coupled to the horizontal oscillator control circuit.

Figure 3:
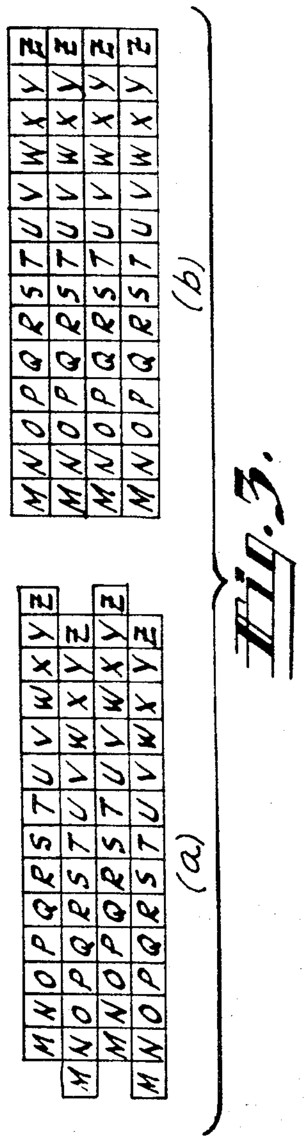
FIGURES 3*a* and 3*b* are diagrammatic illustrations of message information presentations which assist in explaining the operation of the circuit of FIGURE 2.

If such usual apparatus were to be used in the above-described television message system, the following would be found to exist. First, the control circuit 110 would mistake the out of phase pulses and serrations as indications that the 15,750 c.p.s. horizontal oscillator 120 is off frequency. It would therefore produce an erroneous error voltage to compensate, by altering the phase of the oscillator 120. Since the equalizing pulses start one line after the last horizontal synchronizing pulse in an even field (FIGURE 1, waveform A) and one-half line after that pulse in an odd field (FIGURE 1, waveform B), the build up in error voltage would commence at different times in the two fields. The accumulated error voltage at any instant of time in the vertical blanking interval, including that corresponding to the time of insertion of the auxiliary message signal, would then be different from one field to the next. This difference in error voltage is illustrated in waveform E of FIGURE 1 where the even field build up, represented by the curve X, begins with the first out-of-phase equalizing pulse 10*a* of waveform A, while that for the odd field, represented by the curve Y, begins with the first out-of-phase equalizing pulse 10*b* of waveform B. The error voltage curves X and Y would then continue to build up through the equalizing pulse and vertical synchronizing pulse intervals until they reach a maximum at a point corresponding to the last out-of-phase equalizing pulse 10*a* and 10*b* respectively, at which time they would begin to decay towards zero volts as shown. Due to the different error voltages $e_1$ and $e_2$ for the curves X and Y at the time of message insertion, the phase of the horizontal oscillator 120 during this time interval and hence the horizontal scanning line position for the thin window tube of the message system receiver, would differ from one field to the next. Since the auxiliary message is printed out on the Electrofax unit during this interval, this difference in line position would cause information elements of alternate lines of the recorded message to be displaced with respect to one another. Such displacement is illustrated by the presentation of FIGURE 3*a*, where M, N, O, etc. represent various message information elements. By eliminating the out-of-phase pulses and serrations according to the principles of the horizontal synchronizing control apparatus of the present invention, however, a uniform horizontal scanning line position is established from field to field. The message presentation is then as illustrated in FIGURE 3*b*.

Referring now more particularly to the synchronizing control apparatus 100, the arrangement there represented includes a pair of NPN transistors 101 and 103, each having base, emitter and collector electrodes. The base electrode of transistor 101 is coupled to the input terminal 150 by means of a resistor 105 and a capacitor 107 while the emitter electrode of transistor 101 is connected to a point of reference potential, such as ground. The collector electrode of transistor 101 is coupled to a source of energizing potential $+V_1$ by means of a resistor 109 and to the base electrode of transistor 103 through a capacitor 111. The emitter electrode of transistor 103 is coupled to the reference potential point by the parallel combination of a resistor 113 and a capacitor 115 and, also, to a source of energizing potential $-V_2$ by means of resistor 117. The source $-V_2$ is additionally coupled to the base electrode of transistor 103 by a resistor 119, which forms a first time-constant network with the capacitor 111. The collector electrode of transistor 103 is connected through a resisor 121 to a source of energizing potential $+V_3$ and via a lead 123 to the output terminal 175. A pair of resistors 125 and 127 serially connect the base electrode of transistor 101 to an energizing source $+V_4$. A capacitor 129 is coupled between the junction of resistors 125 and 127 and the reference potential point and forms a second time-constant network with the resistor 127. A diode 131 is coupled between the junction of resistors 125 and 127 and the collector electrode of transistor 103. with the anode electrode of the diode 131 connected at the junction and with the cathode electrode of the diode 131 connected at the collector electrode of transistor 103. Resistor 119 and capacitor 111 are selected to provide a time constant which is of the same order of magnitude as, and preferably equal to, the duration of the horizontal synchronizing pulse. Resistor 127 and capacitor 129, on the other hand, are selected to provide a time constant which is larger than half the horizontal line period but shorter than the entire horizontal line period.

The operation of control apparatus 100 is as follows. Under quiescent signal conditions, resistor 125, resistor 127 and energizing source $+V_4$ bias transistor 101 into a conducting condition. Resistors 113, 117 and 119 and potential source $-V_2$ similarly bias transistor 103 into a non-conducting condition. Application of the leading edge of a negative going horizontal synchronizing pulse at input terminal 150, the last such pulse in an even field (FIGURE 1, waveform A) for example, then renders transistor 101 non-conducting. A positive voltage pulse is developed at the collector electrode of transistor 101, charging capacitor 111. The charging of capacitor 111, in turn, produces a voltage pulse with a positive leading edge at the base electrode of transistor 103 which drives transistor 103 into saturation. This produces a negative going voltage pulse at its collector electrode which is substantially in synchronism with the leading edge of the input signal.

Under quiescent conditions, the voltage developed at the junction of resistors 125 and 127 places a positive charge on capacitor 129. When the transistor 103 is driven into saturation, the diode 131 becomes forward biased, and the capacitor 129 discharges toward the bias voltage at the emitter electrode of that transistor. The voltage established at the junction of resistors 125 and 127 by the discharge of capacitor 129 is coupled back to the base electrode of transistor 101 and is effective to hold that transistor in its nonconducting state. Transistor 101 will remain in this nonconducting condition until the bias voltage at its base electrode is re-established by virtue of the positive charging of capacitor 129 through resistor 127, at which time it will be returned to its conducting state.

As was previously mentioned, the time constant of the network formed by resistor 119 and capacitor 111 is of the same order of magnitude as the duration of the horizontal synchronizing pulse. Capacitor 111 discharges through resistor 119 in this time and re-establishes the negative quiescent bias voltage applied to the base electrode of transistor 103. Transistor 103 is thus returned to its original non-conducting condition, and a positive going step is produced at its collector electrode. The resulting pulse developed during the conductive interval of transistor 103 is of comparable duration to the horizontal synchronizing pulse and is coupled along the lead 123 to the output terminal 175.

As was also mentioned, the time constant of the network formed by resistor 127 and capacitor 129 is longer (i.e., greater than the time of one cycle of a pulse occurring at twice the horizontal synchronizing repetition rate) than one-half the horizontal line linterval, but shorter than the entire horizontal line interval (i.e., less than the cycle time of a pulse occurring at the horizontal synchronizing repetition rate). By choosing the time constant in this manner, transistor 101 will be unaffected by a succeeding out-of-phase equalizing pulse or vertical serration which may occur a half horizontal line interval after the last pulse since the positive charging voltage established across capacitor 129 at that time will not yet be of a value to render transistor 101 conductive. Transistor 101 will respond, however, to a succeeding horizontal synchronizing repetition rate pulse and to an equalizing pulse or vertical serration which is in phase therewith since the positive charging voltage developed across capacitor 129 has by that time rendered it conductive once again, and an output signal will be produced as described above. It will be noted that the turn-off of transistor 103 by the resistor 119-capacitor 111 network after its saturation is reinforced by the decrease in positive voltage at the collector electrode of transistor 101 as capacitor 129 charges up towards the value of the potential source $+V_4$. Waveforms F and G in FIGURE 1, respectively, represent the pulse signals developed at the collector electrodes of transistors 101 and 103.

The synchronizing control apparatus of FIGURE 2 is thus effective to produce a train of pulses at its output terminal 175, the leading edges of which are in time synchronism with the leading edges of the horizontal synchronizing rate pulses of the composite synchronizing signal and with those equalizing pulses and vertical serrations which are in phase with the horizontal synchronizing pulses. The duration of these pulses, furthermore, are substantially equal to that of the horizontal synchronizing rate pulses. This is illustrated by the waveforms of FIGURE 1 where it will be seen that an output pulse appears in waveforms C and D only where there exists in waveforms A and B, either a horizontal synchronizing pulse, or an equalizing pulse or vertical serration in phase therewith.

The following circuit constants are presented as being illustrative of values that may be utilized in this synchronizing control apparatus:

| | | |
|---|---|---|
| Transistor **101** | | 2N3643 type |
| Transistor **103** | | 2N3643 type |
| Resistor **105** | kilohms | 4.7 |
| Resistor **109** | do | 2.0 |
| Resistor **113** | do | 1.0 |
| Resistor **117** | do | 3.9 |
| Resistor **119** | do | 9.1 |
| Resistor **121** | do | 5.6 |
| Resistor **125** | ohms | 220.0 |
| Resistor **127** | kilohms | 24.0 |
| Capacitor **107** | micro-micro-farads | 470 |
| Capacitor **111** | micro-farads | .001 |
| Capacitor **115** | do | 1.0 |
| Capacitor **129** | do | .01 |
| Diode **131** | | 1N457 type |
| Potential source, volts D-C: | | |
| $V_1$ | | +15 |
| $V_2$ | | −15 |
| $V_3$ | | +15 |
| $V_4$ | | +15 |

It should be noted that the horizontal synchronizing control apparatus of the present invention, though described as it would be used in one embodiment of the television message system of application 551,084, would perform equally as well as part of the horizontal deflection system of monitors or home television receivers. By removing the out-of-phase equalizing pulses and vertical serrations from the synchronizing information just prior to their application to the horizontal synchronizing control circuit of the receiver, the warping or tearing of the reproduced picture at the start of each field they might otherwise cause can be eliminated. When used in such an environment, the synchronizing signal separator would represent that of the television receiver while the horizontal deflection circuit 130 would be coupled to the horizontal deflection yoke of the kinescope.

It should additionally be noted that the principles of the present invention are equally applicable in that embodiment of the television message system described in the above-cited application wherein a cathode ray tube and a Polaroid camera are used to display and record the auxiliary message information. By eliminating the out-of-phase pulses and serrations with control apparatus embodying the invention, a uniform message presentation for alternate television fields would be established.

We claim:

1. For use in conjunction with a television message system of the type wherein message representative line scan video signals developed by an auxiliary video pick-up device and sequentially multiplexed with regular television program video signals developed by a primary video pick-up device during predetermined portions of the vertical blanking interval thereof at a rate of one line scan signal per message per field of program information are displayed at said rate by a cathode ray tube having an electron beam, apparatus comprising:

horizontal synchronizing control circuit means for synchronizing a horizontal deflection system for the electron beam of said tube;

a source of composite synchronizing signals including synchronizing pulses occurring at the repetition rate of and out-of-phase with horizontal synchronizing pulses at the end of alternate fields of information and also including synchronizing pulses occurring at said rate and in phase with said horizontal synchronizing pulses; and means responsive to said composite signals for generating for said horizontal synchronizing control circuit means a train of pulses synchronized with said in phase pulses and of a duration of the same order of magnitude as said horizontal synchronizing pulses; said means including:

a first amplifier stage having an input terminal connected to said source of composite signals, a control terminal and an output terminal;

a second amplifier stage having an input terminal and an output terminal;

a first charge-discharge network coupled between the output terminal of said second amplifier stage and the control terminal of said first amplifier stage, exhibiting a time constant longer than the time of one cycle of a pulse occurring at twice the horizontal synchronizing repetition rate and shorter than the time of one cycle of said horizontal synchronizing pulses;

a second charge-discharge network coupled between the output terminal of said first amplifier stage and the input terminal of said second amplifier stage, exhibiting a time constant of the same order of magnitude as the duration of said horizontal synchronizing pulses; and means for connecting the output terminal of said second amplifier stage to said control circuit means.

2. Apparatus as defined in claim 1 wherein said first charge-discharge network exhibits a charge time constant longer than the time of one cycle of a pulse occurring at twice the horizontal synchronizing repetition rate and shorter than the time of one cycle of said horizontal synchronizing pulses.

3. Apparatus as defined in claim 2 wherein said second charge-discharge network exhibits a discharge time constant substantially of the same order of magnitude as the duration of said horizontal synchronizing pulses.

4. Apparatus as defined in claim 2 wherein said second charge-discharge network exhibits a discharge time constant substantially equal to the duration of said horizontal synchronizing pulses.

5. Apparatus as defined in claim 1 wherein said first and second amplifier stages each include a transistor having base and collector electrodes, wherein said first charge-discharge network is coupled between the collector electrode of said second amplifier stage transistor and the base electrode of said first amplifier stage transistor and wherein said second charge-discharge network is coupled between the collector electrode of said first amplifier stage transistor and the base electrode of said second amplifier stage transistor.

6. Apparatus as defined in claim 1 wherein said first amplifier stage includes:

a first transistor having a collector electrode connected to a first potential supply source through a first resistor, a base electrode connected to said source of composite signals by means of a second resistor and a first capacitor connected in series, and an emitter electrode connected to a point of reference potential, wherein said second amplifier stage includes:

a second transistor having a collector electrode connected to a second potential supply source through a third resistor, a base electrode, and an emitter electrode connected to a third potential supply source via a fourth resistor and to said point of reference potential by means of a fifth resistor and a second capacitor connected in parallel, wherein said first charge-discharge network includes:

a sixth resistor and a third capacitor connected at one of their two respective ends to form a junction point which is coupled via a diode to the collector electrode of said second transistor and via a seventh resistor to the base electrode of said first transistor, with the other end of said sixth resistor being connected to a fourth potential supply source and with the other end of said third capacitor being connected to said point of reference potential, wherein said second charge-discharge network includes:

an eighth resistor and a fourth capacitor connected at one of their two respective ends to form a junction point which is connected to the base electrode of said second transistor, with the other end of said eighth resistor being connected to said third potential supply source and with the other end of said fourth capacitor being connected to the collector electrode of said first transistor, and wherein said second amplifier stage output terminal connecting means includes:

a direct connection from the collector electrode of said second transistor to said control circuit means.

7. For use in conjunction with a cathode ray type image reproducing device in an interlaced scanning system, apparatus comprising:

horizontal synchronizing control circuit means for synchronizing a horizontal deflection system for the electron beam of said cathode ray device;

a source of composite synchronizing signals including synchronizing pulses occurring at the repetition rate of and out-of-phase with horizontal synchronizing pulses at the end of alternate fields of information and also including synchronizing pulses occurring at said rate and in phase with said horizontal synchronizing pulses; and means responsive to said composite signals for generating for said horizontal synchronizing control circuit means a train of pulses synchronized with said in phase pulses and of a duration of the same order of magnitude as said horizontal synchronizing pulses; said means including:

a first amplifier stage having an input terminal connected to said source of composite signals, a control terminal and an output terminal;

a second amplifier stage having an input terminal and an output terminal;

a first charge-discharge network coupler between the output terminal of said second amplifier stage and the control terminal of said first amplifier stage, exhibiting a time constant longer than the time of one cycle of a pulse occurring at twice the horizontal synchronizing repetition rate and shorter than the time of one cycle of said horizontal synchronizing pulses;

a special charge-discharge network coupled between the output terminal of said first amplifier stage and the input terminal of said second amplifier stage, exhibiting a time constant of the same order of magnitude as the duration of said horizontal synchronizing pulses; and means for connecting the output terminal of said second amplifier stage to said control circuit means.

References Cited

UNITED STATES PATENTS 2,874,213 12/1959 Beers ............... 178—5.6

ROBERT L. GRIFFIN, Primary Examiner

R. L. RICHARDSON, Assistant Examiner

U.S. Cl. X.R.

178—5.6